(12) United States Patent
Boyle

(10) Patent No.: US 7,185,325 B2
(45) Date of Patent: Feb. 27, 2007

(54) APPLICATION CLASS EXTENSIONS

(75) Inventor: William O. Boyle, Burlington, MA (US)

(73) Assignee: Brooks Automation, Chelmsford, MA (US)

( * ) Notice: Subject to any disclaimer, the term of this patent is extended or adjusted under 35 U.S.C. 154(b) by 549 days.

(21) Appl. No.: 10/226,907

(22) Filed: Aug. 23, 2002

(65) Prior Publication Data

US 2003/0051229 A1 Mar. 13, 2003

Related U.S. Application Data

(60) Provisional application No. 60/314,899, filed on Aug. 24, 2001.

(51) Int. Cl.
*G06F 9/45* (2006.01)

(52) U.S. Cl. ............... 717/147; 717/120; 717/121; 717/122

(58) Field of Classification Search ........ 717/106–109; 707/100; 706/47
See application file for complete search history.

(56) References Cited

U.S. PATENT DOCUMENTS

| | | | |
|---|---|---|---|
| 5,857,212 A | 1/1999 | Van De Vanter | ............ 707/519 |
| 6,237,135 B1* | 5/2001 | Timbol | ................. 717/107 |
| 6,637,020 B1* | 10/2003 | Hammond | ................ 717/107 |
| 6,816,865 B2* | 11/2004 | O'Brien et al. | ............ 707/100 |
| 6,851,105 B1* | 2/2005 | Coad et al. | ................. 717/106 |
| 2002/0174082 A1* | 11/2002 | Miloushev et al. | ............ 706/47 |
| 2002/0184610 A1* | 12/2002 | Chong et al. | ................ 717/109 |
| 2003/0023604 A1* | 1/2003 | O'Brien et al. | ............ 707/100 |

OTHER PUBLICATIONS

MoHCA-Java: A Tool for C++ to Java Conversion Support, Scott Malabarba, et al., ACM, Mar. 1999, pp. 650-653.
The Architecture of Montana: An Open and Extensible Programming Environment with an Incremental C++ Compiler, Michael Karasick, ACM, Nov. 1998, pp. 131-142.
Actors & Agents-From Active Objects to Autonomous Agents, Zahia Guessoum et al., IEEE, Sep. 1999, pp. 68-76.
From Active Objects to Autonomous Agents, Zahia Guessoum et al., Http://citeseer.nj.nec.com/cs—Citeseer Scientific Literature Digital Library, 1999, pp. 1-19.

* cited by examiner

*Primary Examiner*—Meng-Al T. An
*Assistant Examiner*—Mark P. Francis
(74) *Attorney, Agent, or Firm*—Perman & Green, LLP; Richard Pickreign

(57) ABSTRACT

A method for extending a first application class includes integrating a first data buffer within the first application class for holding extended properties, and utilizing a rule based engine to determine the values to associate with one or more of the extended properties of the first application class.

20 Claims, 5 Drawing Sheets

APPLICATION CLASS EXTENSIONS

CLAIM OF PRIORITY

This application claims priority from Provisional Application Ser. No. 60/314,899, filed Aug. 24, 2001.

BACKGROUND OF THE INVENTION

1. Field of the Invention

The present invention relates to extending the behavior and properties of application classes and, more particularly, to providing these extensions during runtime without modifying existing code.

2. Brief Description of Related Developments

There are no known methods that allow the runtime extension of application classes within C++ or any other programming language which is compiled directly to machine code, such that the original program is left in an unmodified state. Presently, access to a compatible compiler for all systems in use is required, appropriate application code must be written and compiled, and then the binary files required for linkage of the final executable program must be accessed. This results in an entirely new program with the concomitant requirements for extensive regression testing and validation.

It would be advantageous to be able to extend the behavior and properties of application classes without modifying the original program, and thus eliminating the need for access to compatible compilers and binary files, and also eliminating the need for extensive regression testing and validation.

SUMMARY OF THE INVENTION

The present invention is directed to a technique for extending application classes, that is, altering the structure of an existing class, creating new classes, or modifying the structure of an instance of a class by context. These application class extensions are executed at runtime without altering the original program.

The present invention operates by integrating a generic, resizable, data buffer within existing classes that can hold the data represented by the extended properties, and by providing a rule-based engine which can determine the relationships and behaviors of application classes based upon their properties, resulting in a mechanism by which application users can modify the properties and behavior of application systems without programming or modification of the original program.

In one embodiment, the invention includes a method for extending a first application class. The method includes integrating a first data buffer within the first application class for holding extended properties, and utilizing a rule based engine to determine the values to associate with one or more of the extended properties of the first application class.

In another embodiment, the invention is directed to a computer program product including a computer useable medium having computer readable code means embodied therein for causing a computer to extend a first application class. The computer readable code means in the computer program product includes computer readable program code means for causing a computer to integrate a first data buffer within the application class for holding extended properties, and computer readable program code means for causing a computer to utilize a rule based engine to determine one or more of the extended properties to associate with the first application class.

In a further embodiment, the invention is directed to a controller for a substrate processing apparatus. The controller includes first circuitry for extending a first application class, which includes circuitry for integrating a first data buffer within the application class for holding extended properties, and circuitry for utilizing a rule based engine to determine one or more of the extended properties to associate with the first application class.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENT

Figures 1, 1A:
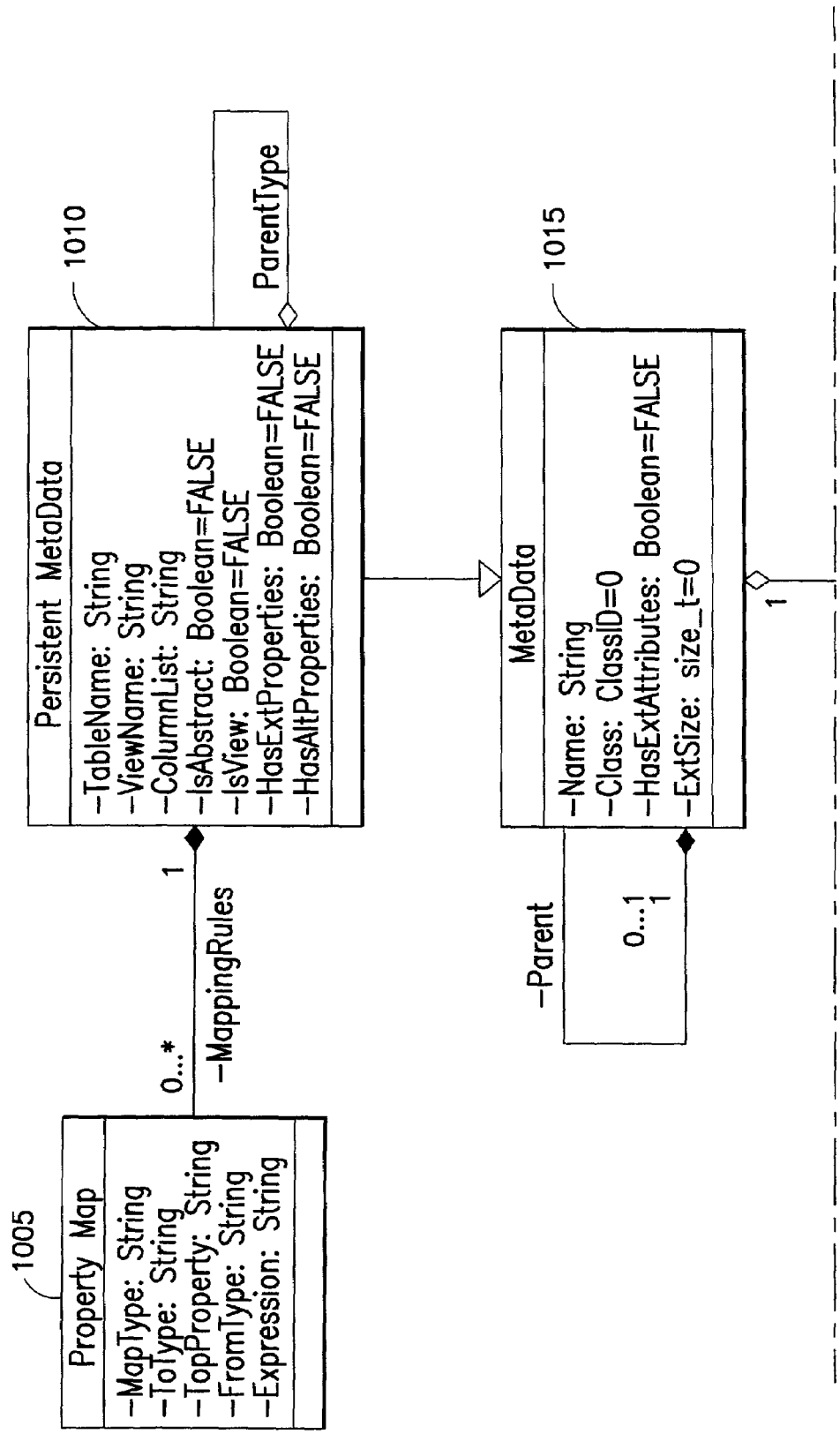
FIG. 1 is a class structure diagram showing the relationship between metadata and class attributes.
Figure 1B:
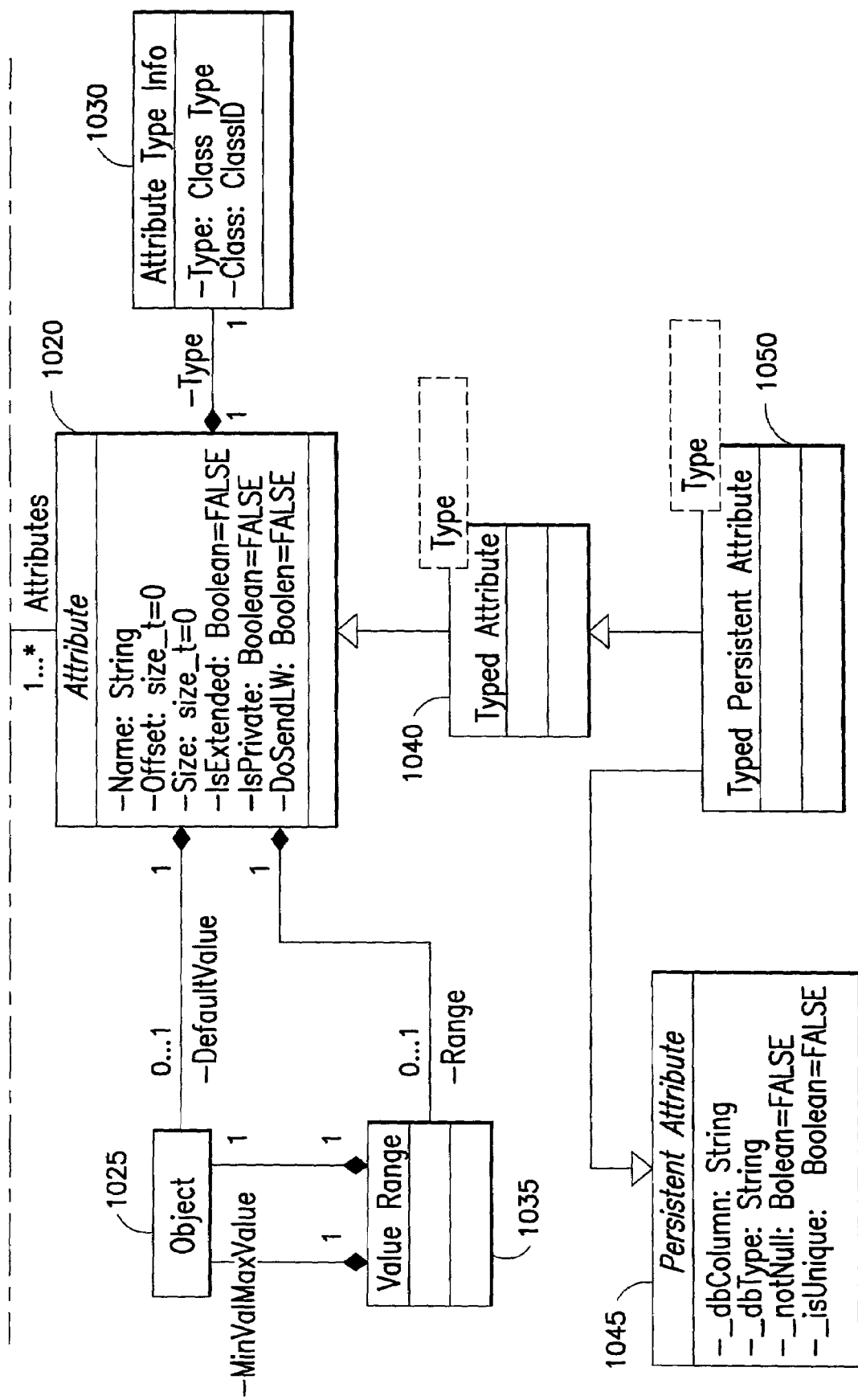

Although the present invention will be described with reference to the embodiment shown in the drawings, it should be understood that the present invention can be embodied in many alternate forms of embodiments. In addition, any suitable size, shape or type of elements or materials could be used.

FIG. 1 is a class structure diagram showing the relationships between properties in a property map 1005, persistent metadata 1010, metadata 1015, attributes 1020, attribute default value 1025 and object value ranges 1035, attribute types 1030, and typed, typed persistent, and persistent attributes 1040, 1050, 1045.

Figure 2:
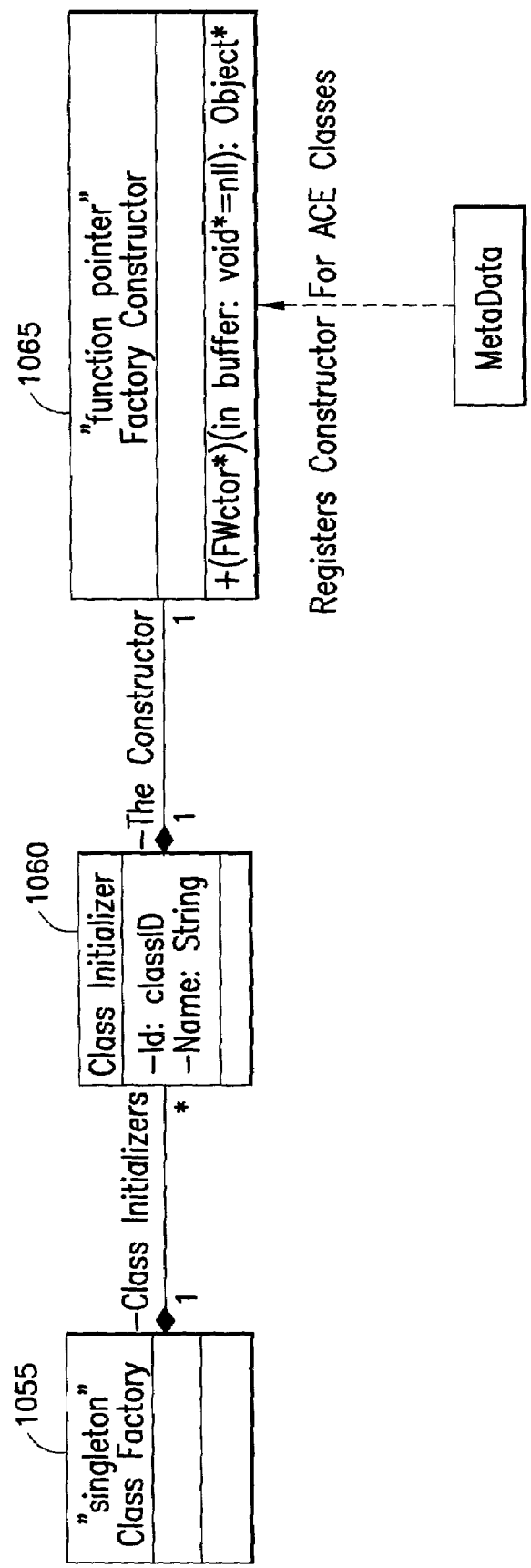
FIG. 2 is a class structure diagram showing a class factory and its integration with the class metadata.

FIG. 2 shows a class factory 1055, its integration with the class metadata 1015, and its relationship with class initializers 1060 and a factory constructor 1065.

Figure 3:
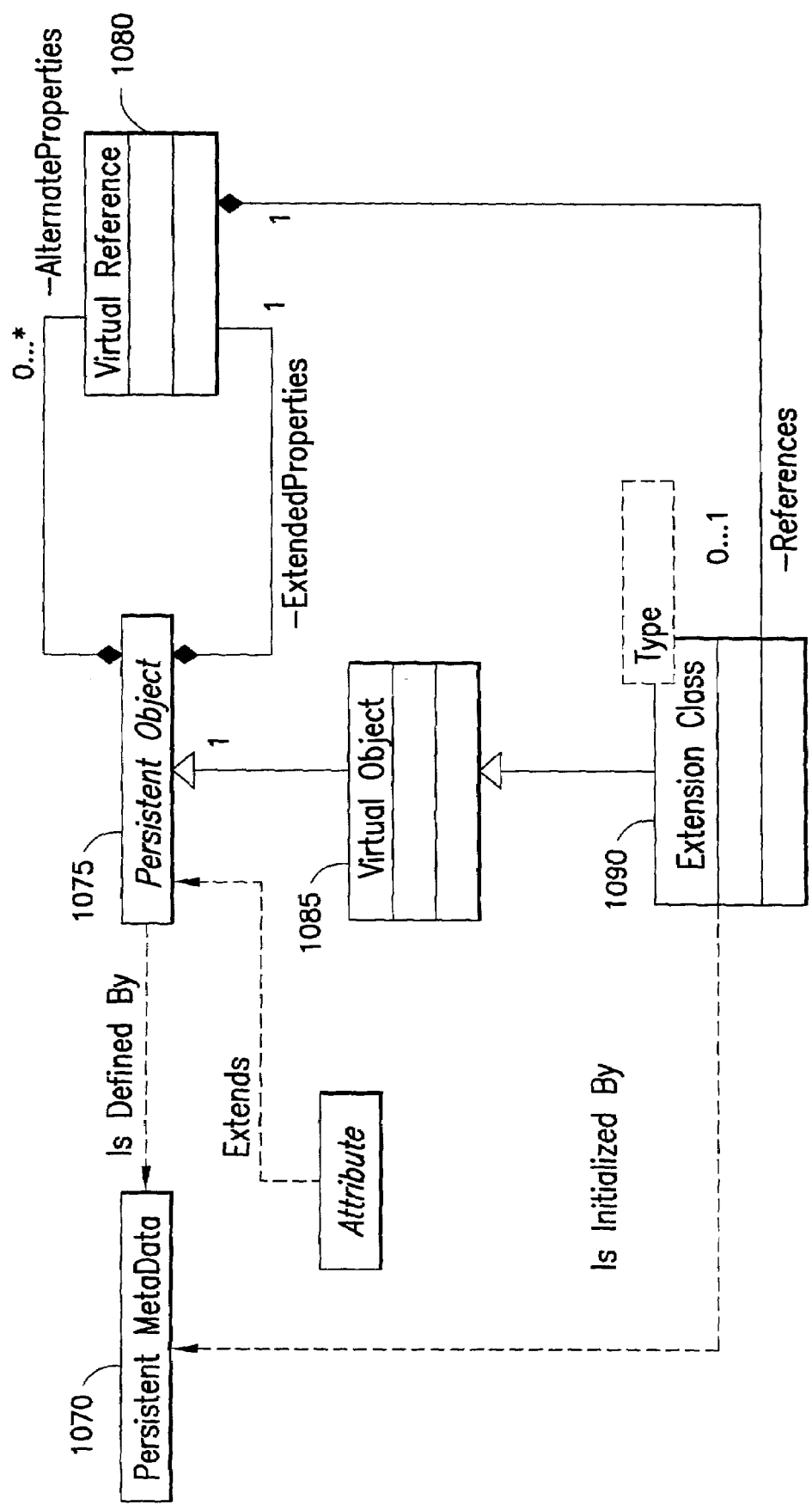
FIG. 3 is a class structure diagram showing the relationships between extension classes, persistent objects, and dynamic extended properties.

FIG. 3 shows the relationships between extension classes 1090, and persistent objects 1075, and virtual objects 1085, dynamic extended properties 1080, and persistent metadata 1070.

As shown in FIG. 1, the present invention generally comprises a means of describing the structure of a class (the metadata 1015 with its associated attributes 1020) with enough information so that the class factory 1055 shown in FIG. 2 is able to construct instances of the class. FIG. 3 illustrates how additional properties 1080 can be associated with an object 1075 dynamically at runtime without modifying the structure of the class the object belongs to. FIG. 3 also shows the relationships between extension classes 1090, persistent objects 1075, and dynamic extended properties. In object oriented programming, a class is defined as a typed data structure that includes properties that define the state of instances of the class. An object is commonly known as an instance of a class whose state properties determine the identity of that object. At least for purposes of this invention, an attribute 1020, 1040, 1045, 1050 includes information about a specific class property that allows it to be constructed, accessed, set, and destroyed by knowing only the name of the property. A property may be an attribute of a class, the set of which constitute the structure of the class, and whose values determine the state of any particular instance of the class. Metadata 1010, 1015 is defined as information about the structure of data in an application. Metadata may be expressed as the definition of a class with all associated properties and attributes.

According to the present invention, an application may alter the structure of an existing class, create entirely new classes that may be utilized just like any other class predefined in the application, or modify the structure of an instance of a class at runtime depending upon the runtime context of that particular object. In accordance with the invention, this may be accomplished by specifying these changes in a repository and loading them into the running application, without coding, compiling, or in any way altering the existing code or structure of the application program itself. This allows an application to make the above mentioned changes without modifying existing computer code and without generating a new application. This ability to alter a class, create a class, or modify the structure of a class as described herein is referred to as application class extension (ACE).

As an example, the Java or Visual BASIC languages require structural modifications to an application be written in the appropriate computer language and recompiled. This alters the fundamental structure and behavior of the program, whereas, as explained below, extension of application classes in accordance with the invention does not require such alterations.

ACE includes establishing detailed information about the structure of a class and its properties, and establishing a class factory to use this structure and properties information to alter structures, create new classes, or to modify the structure of an instance depending on context.

Information about class structure may be included in metadata. Extension of application classes requires detailed information about the structure of a class and its properties, that is, the class metadata 1010, 1015. This information may either be compiled into the application, or stored in a repository and loaded into the application memory at runtime. The class metadata is utilized by the class factory 1055 to create new instances of a class when identified by name or ID, or to access class properties when similarly identified. In other words, the class factory can look up the metadata of any class by name or ID, then can use that information to properly construct a new instance of the class including the extended properties of the class. The present invention allows an application to add new properties to the metadata of a class, which will alter the structure of instances constructed by the class factory.

In a compiled language such as C++, the layout of a class is determined at the time the class is compiled. A mechanism by which these new properties may have storage space allocated and their initialization code executed (where necessary) is required so that instances of the class will have access to these new properties. This invention provides a way to associate an attribute class with each property. An attribute class instance is generated for each class property and kept with the class metadata. The attribute instances are the substance of the class metadata in that they define each property belonging to instances of the class.

The metadata for each class includes general information, preferably the class name and ID so that the class factory can look up a class by name or ID. Other information provides support for runtime type identification functions such as isA(class) and isKindOf(class) queries, as well as links to base classes, and a link to a collection of the attributes (property definitions) of the class.

Each property of a class has an attribute object associated with the class metadata. This object contains information that allows the class constructors to locate the property's memory and to initialize it properly before the constructor is finished. Properties that are compiled into a class are initialized by code generated by the compiler, but properties for ACE must be initialized by another step that is handled by the attribute class. Each attribute object includes at least the following information: the name of the property; the type of the property; a mechanism to locate the property data; and the size of the property. Optionally, an attribute object may also include the address of the code to properly construct and destroy the property, and a default value to set the property.

This information allows a property to be accessed by name, even if the property is not compiled into the class but is added by application class extension at runtime. This is necessary so that properties can be queried or set by application code.

The present invention also includes managing storage for dynamically defined class properties. The process of managing storage includes: allocating storage space for each property; initializing or constructing each property object; destroying (where appropriate) each property object when no longer needed; and deallocating the storage space for each property.

Since properties used for ACE are not compiled into the structure of the class, the space they utilize must somehow be associated with the appropriate instance of the class, and deallocated when the class instance is destroyed. This is done with a hidden (private) property of the class which encapsulates a variable-sized generic memory buffer. The private property includes all the dynamic (non-compiled) properties of the class and the buffer is allocated when an instance of the class is constructed. The attributes of the class metadata know where their property is located within this buffer, so they can properly initialize, access, set, and destroy the data that they manage at the appropriate times.

As mentioned above, a feature of the present invention is the ability to alter existing class structure. Any class that has representational metadata as described above has the potential to have its structure altered by adding new attributes to a class' metadata to represent each new property. A buffer to contain the new property data may be created and associated with each instance of the class. The buffer is then initialized appropriately utilizing the capabilities of the registered attributes. As a result, new instances of the altered class include both the pre-existing as well as the new properties registered with its metadata.

Another feature of the present invention is the ability to create new classes. Creating a new class is very similar to altering an existing class because the new class is actually based upon a preexisting class. In order for this new class to be recognized by the system, the present invention operates to create and register new metadata with a new name and class ID. The ACE system must also register the appropriate construction methods with the class factory. Upon creation and registration of the new metadata and construction methods, an application may construct instances of this new class by specifying its name to the class factory.

The present invention also includes the ability to alter object structures by context. In order to alter the structure of a specific object according to its runtime context, the ACE application operates to: definitively identify the properties to be associated with the object; set the property values; and delete previous property values that are no longer associated with the current object context.

Context can be defined as the state of an object in conjunction with the overall state of the system at any given point in time. The alteration of the state of the object in question, or of any other relevant object in the system, alters the context and potentially the properties associated with the object. An example of state alteration of an object is demonstrated in the following scenario.

Using a manufacturing system as an example, a class may model the state of a piece of manufacturing equipment. Some of the normal properties of the equipment could be its name, location, capacity, and functional state. For example, the functional state may be "running", "idle", "maintenance", or "unavailable". We may want to associate a different set of properties with this piece of equipment depending upon the functional state. When it is in the "running" state we may want to know what process lot, recipe, and operator are relevant. When it is in the "idle" state we may want to know when it was placed into idle, and by whom. When it is in the "maintenance" state we may want to know the work order being performed on it as well as the technician responsible for the maintenance. These are totally different bits of information, but at each point in time are appropriate for the equipment. Thus, different properties, representing different bits of information, may be associated with different functional states, or contexts, of the equipment as appropriate.

One way of determining context is to recognize when object properties change at runtime. Upon recognition of a change in properties, rules may be used to determine what properties are to be associated with which objects and to alter context properties as required. While the present invention includes determining the context of an object, it is not limited to any particular technique or structure for determining context.

When altering the context properties of an object, the new properties must have their values set, either by the application or by some framework facility that determines what they must be set to. It is preferable that the system framework apply these changes, as they may change over time in such a manner that the application cannot easily adapt to. One way of providing the system framework with the ability to set the property values is by providing a set of property mapping rules 1005. These rules may be stored in a repository, loaded by the application at runtime, and applied to the relevant classes of object when system states change.

Figure 4:
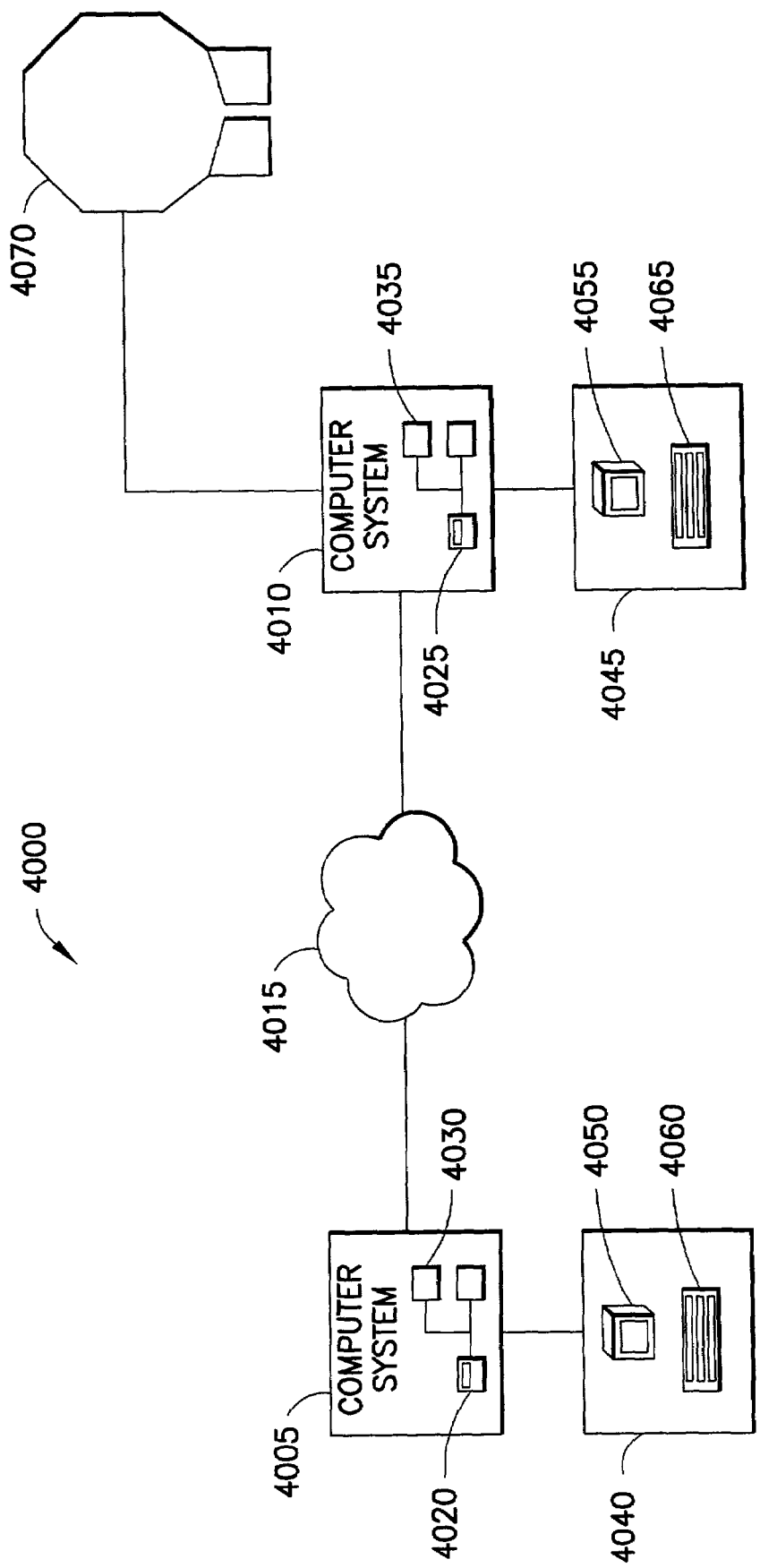
FIG. 4 is a block diagram of one embodiment of a typical apparatus incorporating the features of the present invention.

ACE may be implemented in software and computer programs that are executed in one or more computers. FIG. 4 is a block diagram of one embodiment of a typical apparatus 4000 incorporating the features of the present invention.

As shown, a first computer system 4005 may be linked to a second computer system 4010, such that first and second computer systems 4005, 4010 are capable of exchanging information with each other. In one embodiment, first computer system 4005 could include a server, and first and second computers could communicate through a network, shown in this embodiment as the Internet 4015. First and second computer systems 4005, 4010 may be linked together using any manner suitable for exchanging data including, for example, a modem, hard wire connection, wireless connection, or fiber optic link. Generally, information may be exchanged by first and second computer systems 4005, 4010 using a communication protocol. First and second computer systems 4005, 4010 are generally adapted to utilize program storage devices 4020, 4025 embodying machine readable program source code which is adapted to cause first and second computer systems 4005, 4010 to perform the methods of the present invention. The program storage devices 4020, 4025 incorporating features of the present invention may be devised, made and used as a component of a machine utilizing optics, magnetic properties and/or electronics to perform the procedures and methods of the present invention. In alternate embodiments, the program storage devices 4020, 4025 may include magnetic media such as a diskette or computer hard drive, which is readable and executable by a computer. In other alternate embodiments, the program storage devices 4020, 4025 could include a floppy disk, an optical disk, read-only-memory ("ROM"), random access memory (RAM), any type of semiconductor based storage, or other storage devices suitable for storing information.

First and second computer systems 4005, 4010 each may also include a processor 4030, 4035 for executing stored programs, and may each include a user interface 4040, 4045, that could comprise a display device 4050, 4055 and an input device 4060, 4065.

In a preferred embodiment, second computer system 4010 is coupled to an apparatus for processing substrates 4070, such as semiconductor wafers, flat panel display substrates, or other types of substrates. Second computer system 4010 may include hardware interfaces, software and programs for controlling the operations of substrate processing apparatus 4070. The software and computer programs preferably incorporate the teachings and features of the present invention.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A computer program product comprising a computer readable storage medium including a computer readable program, wherein the computer readable program when executed on a computer causes the computer to extend a first application class by:
   constructing a private property of the first application class which encapsulates a first variable sized data buffer for holding one or more extended properties that are not compiled into the structure of the class;
   allocating the first data buffer when an instance of the first application class is constructed;
   utilizing a rule based engine to determine the values to associate with one or more of the extended properties in the first data buffer;
   creating an attribute to represent each of the one or more extended properties associated with the first application class;
   creating a second data buffer for holding the one or more extended properties associated with the first application class; and
   associating the second data buffer with each instance of the first application class.

2. The computer program product of claim 1, wherein the computer readable program causes the computer to utilize the one or more extended properties associated with the first application class to create a second application class.

3. The computer program product of claim 1, wherein the computer readable program causes the computer to utilize the one or more extended properties associated with the first application class to alter a structure of an instance of the first application class.

4. The computer program product of claim 3, wherein the computer readable program causes the computer to alter the structure of an instance of the first application class by:
 identifying a context of the instance of the first application class;
 identifying a set of the extended properties based on the identified context; and
 utilizing the set of extended properties for the instance of the application class.

5. The computer program product of claim 4, wherein the computer readable program causes the computer to identify the context of an instance by identifying when a system state changes, and wherein the computer readable program causes the computer to identify the set of properties by:
 generating property mapping rules; and
 applying the property mapping rules to the instance upon the identification of the system state change.

6. A computer program product comprising:
 a computer readable storage medium having computer readable code means embodied therein for causing a computer to extend a first application class, the computer readable code means in the computer program product comprising:
  computer readable program code means for causing a computer to construct a private property of the first application class which encapsulates a first variable sized data buffer within the application class for holding one or more extended properties that are not compiled into the structure of the class;
  computer readable program code means for causing a computer to allocate the first data buffer when an instance of the first application class is constructed;
  computer readable program code means for causing a computer to utilize a rule based engine to determine values one or more of the extended properties to associate with the first application class one or more extended properties in the first data buffer;
  computer readable program code means for creating an attribute to represent each of the one or more extended properties associated with the first application class;
  computer readable program code means for creating a second data buffer for holding the one or more extended properties associated with the first application class; and
  computer readable program code means for associating the second data buffer with each instance of the first application class.

7. The computer program product of claim 6, wherein the computer readable code means in the computer program product further comprises:
 computer readable program code means for utilizing the one or more extended properties associated with the first application class to create a second application class.

8. The computer program product of claim 6, wherein the computer readable code means in the computer program product further comprises:
 computer readable program code means for utilizing the one or more extended properties associated with the first application class to alter a structure of an instance of the first application class.

9. The computer program product of claim 8, wherein the computer readable program code means to alter a structure of an instance of the first application class further comprises:
 computer readable program code means for identifying a context of the instance of the first application class;
 computer readable program code means for identifying a set of the extended properties based on the identified context; and
 computer readable program code means for utilizing the set of extended properties for the instance of the application class.

10. The computer program product of claim 9, wherein the computer readable program code means for identifying the context of an instance includes computer readable program code means for identifying when a system state changes, and wherein computer readable program code means for identifying the set of properties includes:
 computer readable program code means for generating property mapping rules; and
 computer readable program code means for applying the property mapping rules to the instance upon the identification of the system state change.

11. An article of manufacture comprising:
 a computer readable storage medium having computer readable program code means embodied therein for causing a computer to extend a first application class, the computer readable code means in the article of manufacture comprising:
  computer readable program code means for causing a computer to construct a private property of the first application class which encapsulates a first variable sized data buffer within the application class for holding one or more extended properties that are not compiled into the structure of the class;
  computer readable program code means for causing a computer to allocate the first data buffer when an instance of the first application class is constructed;
  computer readable program code means for causing a computer to utilize a rule based engine to determine values one or more of the extended properties to associate with the first application class one or more extended properties in the first data buffer;
  computer readable program code means for creating an attribute to represent each of the one or more extended properties associated with the first application class;
  computer readable program code means for creating a second data buffer for holding the one or more extended properties associated with the first application class; and
  computer readable program code means for associating the second data buffer with each instance of the first application class.

12. The article of manufacture of claim 11, wherein the computer readable code means in the computer program product further comprises:
 computer readable program code means for utilizing the one or more extended properties associated with the first application class to create a second application class.

13. The article of manufacture of claim 11, wherein the computer readable code means in the computer program product further comprises:
 computer readable program code means for utilizing the one or more extended properties associated with the first application class to alter a structure of an instance of the first application class.

14. The article of manufacture of claim 13, wherein the computer readable program code means to alter a structure of an instance of the first application class further comprises:

computer readable program code means for identifying a context of the instance of the first application class;

computer readable program code means for identifying a set of the extended properties based on the identified context; and computer readable program code means for utilizing the set of extended properties for the instance of the application class.

15. The article of manufacture of claim 14, wherein the computer readable program code means for identifying the context of an instance includes computer readable program code means for identifying when a system state changes, and wherein computer readable program code means for identifying the set of properties includes:

computer readable program code means for generating property mapping rules; and computer readable program code means for applying the property mapping rules to the instance upon the identification of the system state change.

16. A controller for a substrate processing apparatus comprising:

first circuitry for extending a first application class comprising:

circuitry for constructing a private property of the first application class which encapsulates a first variable sized data buffer for holding one or more extended properties that are not compiled into the structure of the class;

circuitry for causing a computer to allocate the first data buffer when an instance of the first application class is constructed;

circuitry for utilizing a rule based engine to determine values to associate with the one or more extended properties in the first data buffer;

circuitry for creating an attribute to represent each of the one or more extended properties associated with the first application class;

circuitry for creating a second data buffer for holding the one or more extended properties associated with the first application class; and circuitry for associating the second data buffer with each instance of the first application class.

17. The controller of claim 16, further comprising circuitry for utilizing the one or more extended properties associated with the first application class to create a second application class.

18. The controller of claim 16, further comprising circuitry for utilizing the one or more extended properties associated with the first application class to alter a structure of an instance of the first application class.

19. The controller of claim 18, wherein the circuitry to alter a structure of an instance of the first application class comprises:

circuitry for identifying a context of the instance of the first application class;

circuitry for identifying a set of the extended properties based on the identified context; and circuitry for utilizing the set of extended properties for the instance of the application class.

20. The controller of claim 19, wherein the circuitry for identifying the context of an instance includes circuitry for identifying when a system state changes, and wherein the circuitry for identifying the set of properties includes:

circuitry for generating property mapping rules; and circuitry for applying the property mapping rules to the instance upon the identification of the system state change.

* * * * *